(Model.)
R. M. PATTILLO.
COTTON PLANTER.
No. 284,474. Patented Sept. 4, 1883.
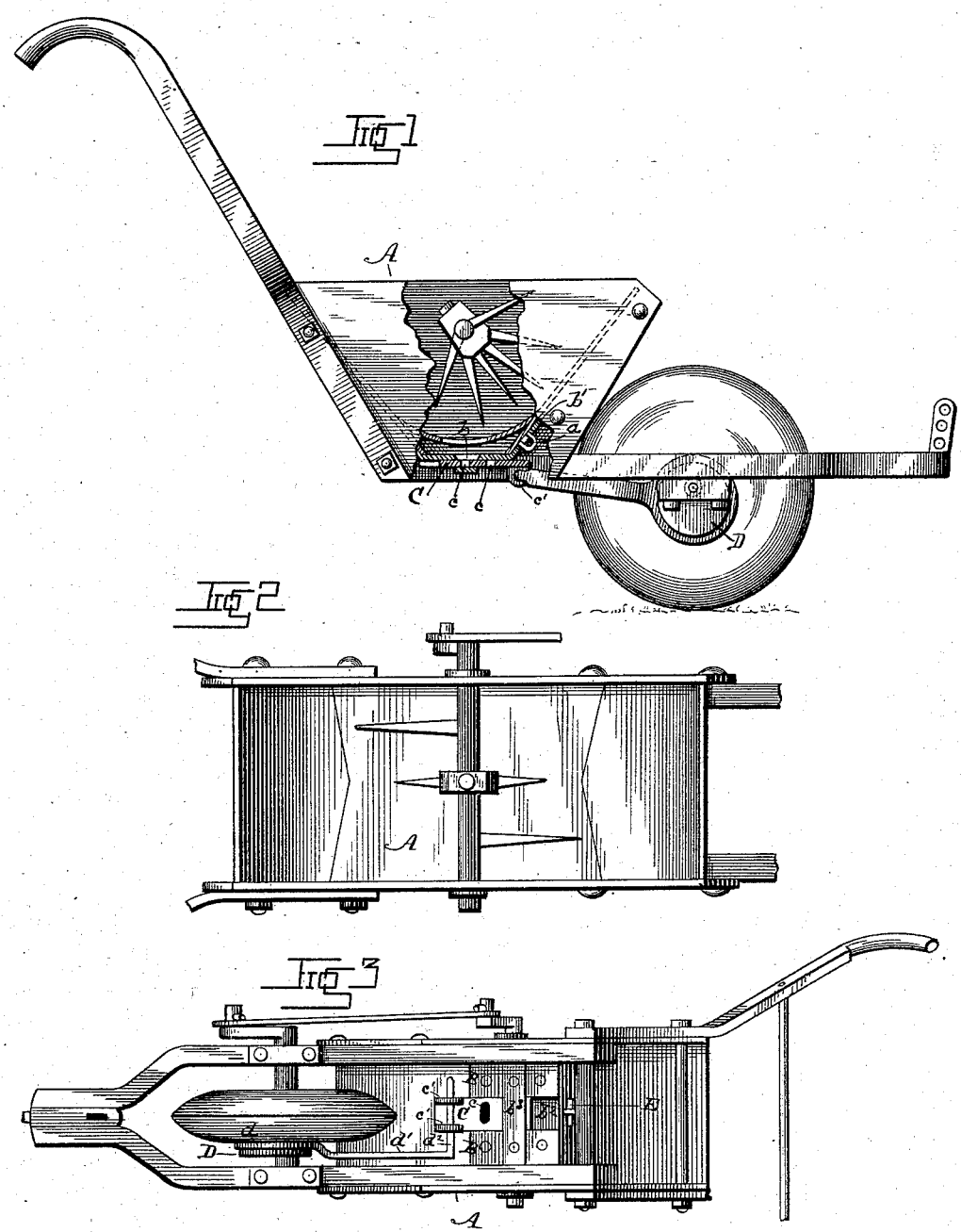
WITNESSES:
Fred. G. Dieterich
INVENTOR.
R. M. Pattillo
By
ATTORNEYS.

UNITED STATES PATENT OFFICE.

ROBERT MORELAND PATTILLO, OF CARTERSVILLE, GEORGIA, ASSIGNOR TO HIMSELF, WM. H. HOWARD, AND THOMAS W. BAXTER, OF SAME PLACE.

COTTON-PLANTER.

SPECIFICATION forming part of Letters Patent No. 284,474, dated September 4, 1883.

Application filed May 12, 1883. (Model.)

*To all whom it may concern:*

Be it known that I, ROBERT M. PATTILLO, a citizen of the United States, residing at Cartersville, in the county of Bartow and State of Georgia, have invented a new and useful Improvement in Cotton-Planters, of which the following is a specification.

Figure 1 is a side elevation, Fig. 2 is a plan, and Fig. 3 is an under side view, of my improved planter.

This invention is an attachment which is specially designed for use in connection with the "Law Cotton-Planter," for the purpose of adapting the same to plant peas, corn, and other seeds; and its novelty consists, mainly, in the combination of an independent plate, having proper mechanism for delivering the seed, with the hopper of the planter, and means for uniting the two together, as will be fully described hereinafter.

In the drawings, A represents the hopper of the Law cotton-planter, or any other planter of similar construction.

$a$ $a$ represent eyes upon the end plates of the hopper, near their lower edges, as shown.

B represents an independent plate, having the main portion $b$, with central opening, and the slotted ears $b'$ $b'$, as shown. These ears, it will be observed, are inclined at a proper angle to engage with the end plates of the hopper, as shown.

$b^2$ represents a recess formed in the lower side of the plate $b$, and $b^3$ a transverse bar covering the central opening in the plate, as shown.

C represents a feed-slide, having openings $c$ $c$ of any proper size, according to the seed to be planted, and ears $c'$ $c'$, as shown.

D represents an eccentric upon the wheel-shaft of the planter, and $d$ a sleeve surrounding the same, which is provided with an arm, $d'$, having a bent end, $d^2$, adapted to enter the ears $c'$ $c'$ of the feed-slide, as shown.

When the plate is in place upon the hopper, the eyes of the hopper, $a$ $a$, extend into the slots of the ears $b'$ $b'$ of the plate, and the independent plate B is secured to the hopper by pins E E, passing through the eyes $a$ of the hopper, as shown.

The independent plate B can readily be removed and another, similarly formed, substituted for it, adapted to sow a different kind of seed when it is desired to do so.

When the independent plate is attached to the hopper, as described, the operation is not materially different from other planting-machines.

The feed-slide is given a reciprocating movement by the eccentric mechanism, and the seed placed in the hopper is consequently delivered at regular intervals to the ground, the seed passing from the hopper into the opening in the slide, and then from this opening, when the same moves past the bar $b^3$, to the ground.

A number of feed-slides having openings of different sizes, according to the seed to be planted, may accompany the machine.

By means of the described construction the ordinary cotton-planter, which is capable only of planting cotton-seed in continuous rows, is adapted to plant seeds generally at intervals.

The independent plate may be readily attached to or removed from the machine when desired.

I am aware that a shoe in which a seed-slide reciprocates has heretofore been detachably secured to the bottom of the hopper of a seed-planter, and I therefore lay no claim, broadly, to such invention.

Having thus fully described my invention, what I claim as new, and desire to secure by Letters Patent, is—

1. The combination, with a hopper having eyes $a$ $a$, of the independent removable plate B, having the upwardly-inclined slotted ears $b'$ $b'$, embracing the sides of the hopper, and the pins E E, substantially as shown and described, whereby different kinds of seed may be sown by the substitution of different plates, as set forth.

2. In combination with the hopper having the eyes $a$ $a$, the independent plate B, having the main portion $b$, with central opening, the slotted ears $b'$ $b'$, the recess $b^2$, and transverse bar $b^3$, the feed-slide C, having the openings $c$ $c$ and ears $c'$ $c'$, the eccentric D, with sleeve $d$, arm $d'$, and bent end $d^2$, and the pins E E, all combined and arranged as and for the purpose described.

ROBERT MORELAND PATTILLO.

Witnesses:
R. A. CLAYTON,
W. H. HOWARD.